United States Patent [19]

Hall

[11] 3,972,476
[45] Aug. 3, 1976

[54] MOBILE FLUID SPRAYER SYSTEM

[76] Inventor: Mark G. Hall, Rte. 2 P.O. Box 269, Bryan, Tex. 77801

[22] Filed: Feb. 21, 1975

[21] Appl. No.: 551,821

[52] U.S. Cl. ............................. 239/167; 239/172; 222/176; 56/10.4
[51] Int. Cl.² .......................................... B05B 1/20
[58] Field of Search .......................... 239/159–161, 239/163, 165–168, 172, 175, 176; 222/176–178; 56/10.4

[56] References Cited
UNITED STATES PATENTS

| | | | |
|---|---|---|---|
| 1,610,556 | 12/1926 | Kirkland | 239/168 |
| 2,590,400 | 3/1952 | Gollnick | 239/166 |
| 2,684,865 | 7/1954 | Lattner | 239/172 X |
| 2,725,256 | 11/1955 | Devost et al. | 239/167 |
| 2,793,909 | 5/1957 | Gerbracht | 239/167 X |
| 2,910,245 | 10/1959 | Burroughs | 239/167 |
| 2,932,931 | 4/1960 | Elfes et al. | 56/10.4 |
| 2,932,933 | 4/1960 | Elfes et al. | 56/10.4 |
| 3,043,519 | 7/1962 | Tygart | 56/10.4 |
| 3,236,456 | 2/1966 | Ackley et al. | 239/168 |
| 3,308,611 | 3/1967 | Barber | 56/10.4 |
| 3,357,642 | 12/1967 | Horton | 239/159 |
| 3,395,503 | 8/1968 | Greenburg et al. | 239/166 X |
| 3,401,890 | 9/1968 | Middlesworth | 239/167 X |
| 3,447,750 | 6/1969 | Weston | 239/159 X |
| 3,545,678 | 1/1968 | Tangeman | 239/166 |
| 3,664,057 | 5/1972 | Dunn | 56/10.4 |
| 3,665,685 | 5/1972 | Allard | 56/10.4 |
| 3,716,212 | 2/1973 | Fox | 56/10.4 |
| 3,807,676 | 4/1974 | Bieker et al. | 239/167 X |

FOREIGN PATENTS OR APPLICATIONS

| | | | |
|---|---|---|---|
| 1,019,295 | 10/1952 | France | 239/167 |
| 1,363,398 | 5/1964 | France | 239/167 |
| 886,277 | 1/1962 | United Kingdom | 239/159 |
| 677,114 | 8/1952 | United Kingdom | 239/168 |
| 717,249 | 10/1954 | United Kingdom | 239/159 |
| 780,941 | 8/1957 | United Kingdom | 239/172 |

*Primary Examiner*—Robert S. Ward, Jr.
*Attorney, Agent, or Firm*—Richards, Harris and Medlock

[57] ABSTRACT

In a mobile fluid sprayer system, sprayer booms are connected to a vehicle by joint structure which permits the boom to pivot upwardly and rearwardly upon engagement with obstructions. The sprayer booms are normally positioned in laterally extending orientations relative to the vehicle by cables which extend angularly upwardly from the booms and are connected to brackets which are pivotally supported on the vehicle. The brackets are spring biased upwardly, and fluid cylinders are employed to damp pivotal movement of the brackets. In this manner the sprayer booms are allowed to pivot freely upwardly upon engagement with obstructions but the return movement of the sprayer booms to the normal positions is substantially damped. Likewise, the sprayer booms are allowed to pivot freely rearwardly upon engagement with obstructions but the return movement of the sprayer booms is substantially damped by means of fluid cylinders which are operatively connected to the booms during their return movement. The damping rate is graduated in both the vertical plane and the horizontal plane such that the rate is greatest when the sprayer booms are at or near the normal positions and is substantially reduced when the sprayer booms are pivoted out of the normal positions.

19 Claims, 4 Drawing Figures

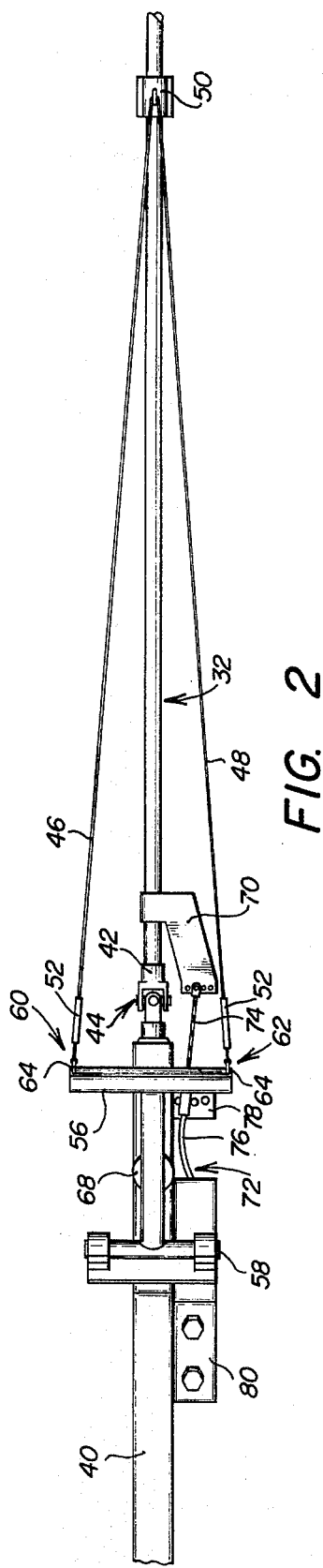
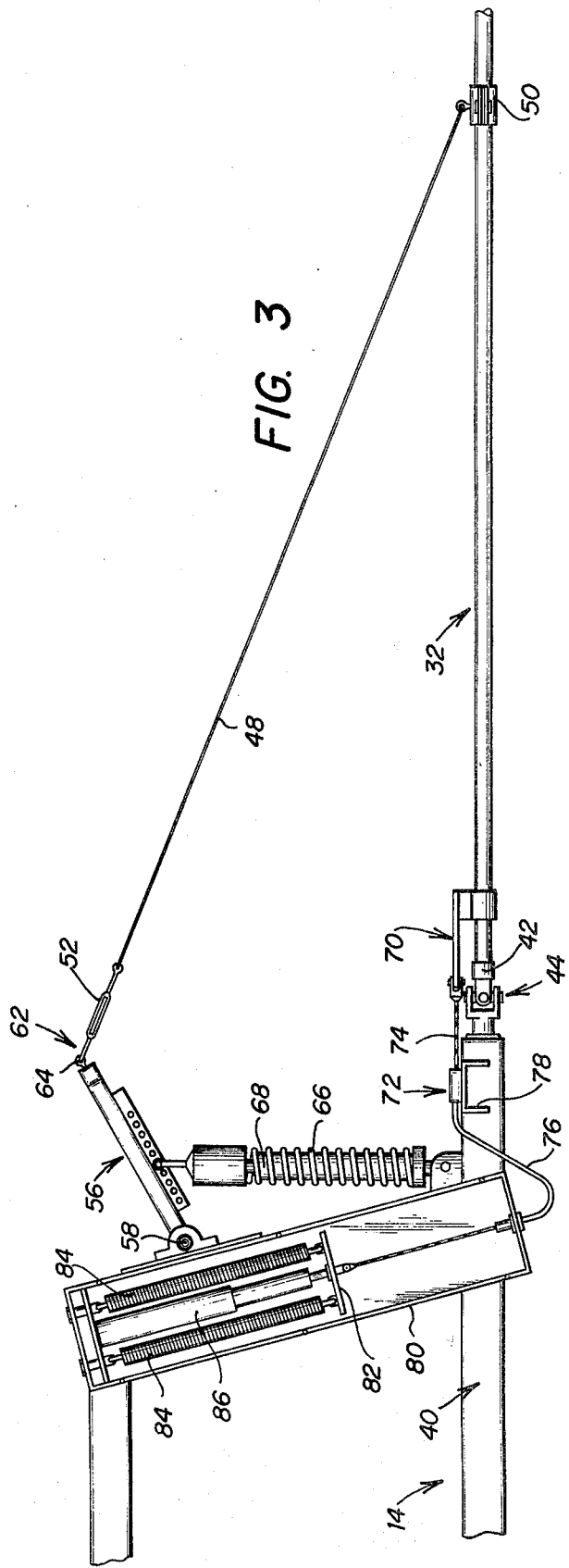

MOBILE FLUID SPRAYER SYSTEM

BACKGROUND AND SUMMARY OF THE INVENTION

This invention relates to mobile fluid sprayer systems, and more particularly to improvements relating to the mounting of the sprayer booms of such systems which substantially extend the working life thereof.

Mobile fluid sprayer systems are utilized in agriculture and related industries to perform a wide variety of functions. For example, mobile fluid sprayer systems are utilized in the application of fertilizers and related products. Conversely, such systems are frequently utilized in the application of herbicides such as weed killers. Mobile fluid sprayer systems may also be utilized to spray insecticides and various other fluids.

Mobile fluid sprayer systems offer significant advantages in the application of these materials. Perhaps most significantly, the materials are applied very rapidly. Also the materials can typically be applied utilizing only one operator. For these and other reasons the use of mobile fluid sprayer systems to apply fluid materials has been found to be very economical.

However, all of the mobile fluid sprayer systems which are presently available for agricultural and related uses also involve at least one significant disadvantage. This relates to the fact that most mobile fluid sprayer systems involve laterally extending booms which are liable to come into engagement with obstructions such as fenceposts, trees, and the like. This usually results in damage to the sprayer system which in turn causes down time, and may necessitate expensive repairs.

Another problem common to most prior art mobile fluid sprayer systems involves the fact that the laterally extending booms thereof are typically either rigidly secured, or are at least very heavy and stiff structures. Because of this the vibration and shock loads that are encountered when mobile fluid sprayer systems are operated over rough terrain cause the boom structures to self-destruct even though they do not come into engagement with any kind of an obstruction. This factor requires the operation of many prior art mobile fluid sprayer systems at substantially reduced speeds in order to maintain the vibration and shock loads that are imposed on the boom structures within acceptable limits.

Attempts have heretofore been made to overcome these problems. One approach has been to provide for pivotal movement of the sprayer boom structure upon engagement with obstructions. It has been found, however, that even this approach does not provide wholly satisfactory results. For example, after the obstruction has been cleared, the sprayer boom may tend to return to its normal position very rapidly resulting in high shock loads, vibrations, and similar problems.

The present invention comprises a mobile fluid spayer system which overcomes the foregoing and other disadvantages long since associated with prior art. In accordance with the broader aspects of the invention, a mobile fluid sprayer system includes at least one generally laterally extending sprayer boom comprising a relatively light, floatingly supported structure. Structure is provided for permitting the boom to freely pivot both upwardly and rearwardly upon engagement of the sprayer boom with an obstruction. The return movement of the sprayer boom to the normal position is substantially damped, whereby the sprayer boom clears the obstruction without damage either due to contact between the boom and the obstruction or due to the return movement of the boom to the normal position. Moreover, the motion of the boom is constantly damped, and the damping rate is graduated, with maximum damping when the boom is at or near the normal position and with reduced damping as the boom is pivoted away from the normal position. This is highly beneficial from at least two standpoints. First, the boom is allowed to return very rapidly from a pivoted position to the normal position, but no significant shock or vibration loads are imposed on the boom due to the rapid return movement. Second, this feature of the invention allows the mobile fluid sprayer system to be operated at relatively high speeds over rough terrain without imposing significant shock or vibration loads on the boom.

In accordance with more specific aspects of the invention, fluid cylinder apparatus is employed in damping the return movement of the sprayer boom to the normal position. Two fluid cylinder apparatus are preferably utilized. Although both fluid cylinder apparatus function to damp both vertical and horizontal boom movement, the first fluid cylinder apparatus serves primarily to damp return motion of the boom in the vertical direction and the second fluid cylinder apparatus serves primarily to damp the return motion of the sprayer boom in the horizontal direction. In this manner the correct amount of damping in both directions is provided.

The sprayer boom extends generally laterally from a vehicle and is normally positioned by a pair of cables extending angularly upwardly from the boom. The cables are connected at points located forwardly and rearwardly from the boom on a bracket which is pivotally supported on the vehicle. The bracket is spring biased upwardly, and the first fluid cylinder apparatus is utilized to damp both upward and downward pivotal movement of the bracket. In this manner the bracket tracks the boom upwardly and return pivotal movement of the sprayer boom in the vertical direction is substantially damped.

Two embodiments of the second fluid cylinder apparatus are disclosed. In one embodiment a fluid cylinder is coupled to the sprayer boom by means of a Bowden wire, and springs are employed to cause the fluid cylinder to follow the motion of the sprayer boom during rearward pivotal movment thereof. The return pivotal movement of the boom is thereafter damped by the fluid cylinder operating through the Bowden wire.

In the second embodiment a cam is secured to the sprayer boom and the fluid cylinder extends to a cam follower. Structure is provided for rapidly advancing the fluid cylinder during rearward pivotal movement of the sprayer boom. The return movement of the fluid cylinder is substantially restricted, thereby providing substantial damping of the return of the sprayer boom to the normal position.

DESCRIPTION OF THE DRAWINGS

A more complete understanding of the invention may be had by reference to the following Detailed Description when taken in conjunction with the accompanying Drawings, wherein:

FIG. 2 is a top view of the sprayer mounting of the mobile fluid sprayer system of FIG. 1;

FIG. 3 is an enlarged rear view of one side of the sprayer boom mounting of the mobile sprayer system in which certain parts have been broken away more clearly to illustrate certain features of the invention.

DETAILED DESCRIPTION

Figure 1:
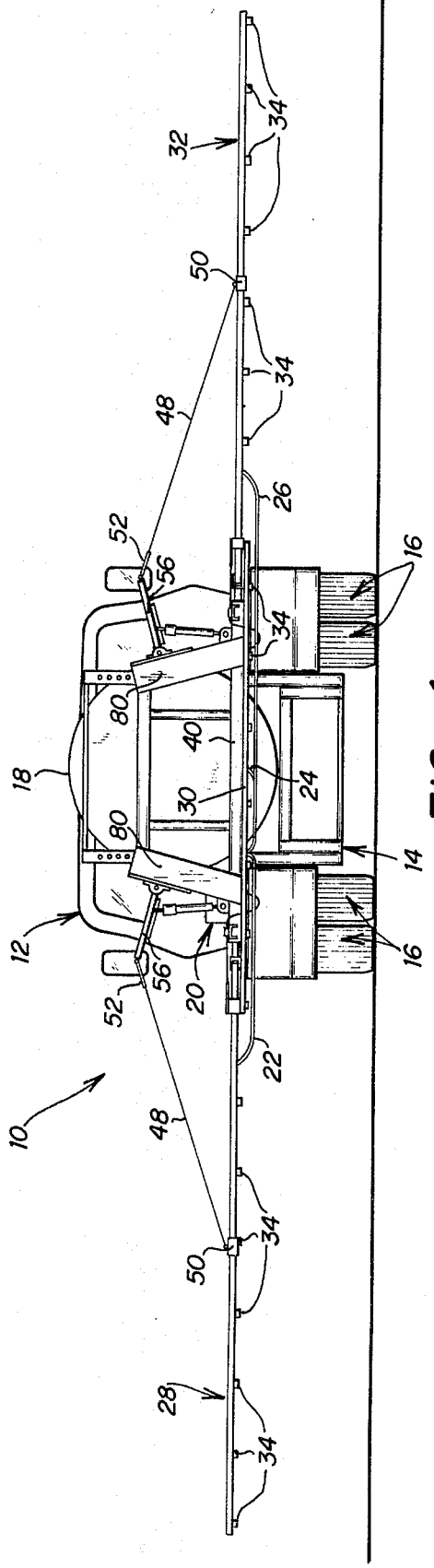
FIG. 1 is a rear view of a mobile fluid sprayer system incorporating the invention.

Referring now to the Drawings, and particularly to FIG. 1 thereof, there is shown a mobile fluid sprayer system 10 incorporating the present invention. The system 10 includes a vehicle 12 which may take the form of a conventional truck. Such a vehicle includes a frame 14 which is supported for movement over a surface by a plurality of wheels 16. The vehicle 12 further includes a conventional engine and a suitable transmission which function to propel the vehicle through certain of the wheels 16. Those skilled in the art will appreciate the fact that the vehicle 12 may comprise other than a truck, if desired. For example, the vehicle 12 may comprise a tracked vehicle, a trailer, etc.

A tank 18 is mounted on the frame 14 of the vehicle 12 and receives a quantity of fluid. A pump 20 is mounted on the vehicle 12 although not necessarily in the position shown in FIG. 1, and functions to withdraw fluid from the tank 18 and to supply pressurized fluid through a plurality of lines 22, 24 and 26. The pump 20 may be driven by conventional means, such as the power take-off facilities of the vehicle 12 or by means of a conventional electric or hydraulic motor.

The line 22 extends to a sprayer boom 28 extending laterally from one side of the vehicle 12, the line 24 extends to a sprayer boom 30 extending across the rear end of the vehicle 12, and the line 26 extends to a sprayer boom 32 extending laterally from the opposite side of the vehicle 12. The sprayer booms 28, 30 and 32 are each provided with a plurality of fluid discharge nozzles 34. The nozzles 34 are positioned at spaced apart points along the lengths of the sprayer booms. It will be understood that the number of nozzles 34 that are utilized in the system may be varied in accordance with the requirements of a particular application.

The mounting of the sprayer boom 32 on the vehicle 12 is illustrated in FIGS. 2 and 3. Those skilled in the art will appreciate the fact that the sprayer boom 28 is mounted substantially identically to the mounting of the sprayer boom 32. However, the orientation of certain of the component parts of the mounting of the sprayer boom 28 is reversed with respect to the orientation of these parts as illustrated in FIGS. 2 and 3.

The frame 14 of the vehicle 12 includes a member 40 extending transversely across the extreme rear end of the vehicle 12. The inboard end of the sprayer boom 32 extends a fluid-tight cap 42, and the cap 42 is in turn connected to the member 40 by means of a universal joint 44. The universal joint 44 is of the type commonly employed in automotive and similar applications and functions to permit pivotal movement of the sprayer boom 32 about axes which are perpendicular to each other and in turn mutually perpendicular to a third axis extending longitudinally along the sprayer boom 32. Other types of joints which permit pivotal movement about perpendicular axes, for example, ball joints, springs, etc., may be used in lieu of the universal joint 44, if desired.

The sprayer boom 32 is normally positioned in a generally laterally extending orientation relative to the vehicle 12 by means of a pair of cables 46 and 48. The cables 46 and 48 are secured to a common, predetermined point on the sprayer boom 32 by means of a bracket 50 connected thereto. The cable 46 extends angularly upwardly and forwardly relative to the sprayer boom 32, and the cable 48 extends angularly upwardly and rearwardly relative to the sprayer boom 32. The inboard ends of the cables 46 and 48 comprise turnbuckles 52 which may be adjusted to control the normal positioning of the sprayer boom 32.

A bracket 56 is pivotally supported on the member 40 by means of a hinge pin 58. The cables 46 and 48 are connected to the bracket 56 at points 60 and 62 defined by eyebolts 64 mounted on the bracket 56. The point 60 is situated a predetermined distance forwardly and the point 62 is located a predetermined distance rearwardly from the point of connection of the sprayer boom 32 to the frame 14 of the vehicle 12 is defined by the universal joint 44. These distances may or may not be equal depending on various design requirements.

The bracket 56 is biased to pivot upwardly by a spring 66 mounted between the member 40 of the frame 14 and the bracket 56. Both upward and downward pivotal movement of the bracket 56 is damped by means of a fluid cylinder apparatus 68 comprising a shock absorber also mounted between the member 40 of the frame 14 and the bracket 56. The damping action of the fluid cylinder apparatus 68 is conventional in nature, i.e., fluid flow through a restricted orifice.

Assume now that the sprayer boom 32 engages an obstruction which causes the sprayer boom 32 to pivot upwardly. It will be noted that such pivotal movement of the sprayer boom 32 is permitted by the universal joint 44. The cables 46 and 48 are adapted to collapse, thereby permitting free upward pivotal movement of the sprayer boom 32. Simultaneously, the bracket 56 begins to pivot upwardly under the action of the spring 66, thereby taking up the slack in the cables 46 and 48. The fluid cylinder apparatus 68 causes the bracket 56 to pivot upwardly relatively slowly, whereby the bracket 56 tracks the boom 32 and any sort of snap action is eliminated.

As soon as the slack in the cables 46 and 48 has been taken up, that is, when the weight of the sprayer boom 32 is again applied to the bracket 56 through the cables 46 and 48, upward pivotal movement of the bracket 56 ends. The sprayer boom 32 then begins to return to its normal position under the action of gravity. Return movement of the sprayer boom 32 to the position shown in FIGS. 2 and 3 requires downward pivotal movement of the bracket 56. Such downward pivotal movement of the bracket 56 and the sprayer boom 32 is substantially damped by the action of the fluid cylinder apparatus 68. The sprayer boom 32 therefore returns to its normal position relatively slowly and under conditions of little or no shock load and little or no vibration.

It will be understood that the geometry of the boom 32, the cables 46 and 48, the bracket 56 and the spring 66 and the fluid cylinder apparatus 68 also contributes significantly to the damping of the return movement of the boom. Thus, as the angle between the cables 46 and 48 and the bracket 56 increases, the spring 66 and the fluid cylinder apparatus 68 exert a greater effect on the downward motion of the boom, whereby the downward motion of the boom is significantly slowed and finally terminated as the boom reaches the normal position. In this manner there is provided graduated damping wherein the damping rate is reduced when the boom is pivoted away from its normal orientation and is significantly increased when the boom is at or near the normal position.

A bracket 70 is secured to the sprayer boom 32 adjacent the inboard end thereof. A Bowden wire 72 includes a cable 74 which is connected to the bracket 70 and a casing 76 which is connected to the member 40 of the frame 14 by a bracket 78.

The opposite end of the casing 76 of the Bowden wire 72 is connected to a housing 80 mounted on the member 40 of the frame 14. The opposite end of the cable 74 of the Bowden wire 72 is connected to a plate 82 mounted within the housing. The plate 82 is biased to move upwardly in the housing 80 by a pair of tension springs 84 each connected between the housing 80 and the plate 82. A fluid cylinder apparatus 86 comprising a shock absorber is also connected between the housing 80 and the plate 82.

The fluid cylinder apparatus 86 includes a check valve, whereby the plate 82 is adapted to move upwardly in the housing 80 under the action of the springs 84 substantially without restraint. Conversely, downward movement of the plate 82 relative to the housing 80 is substantially damped by the action of the fluid cylinder apparatus 86. The fluid cylinder apparatus functions in this regard by typical shock absorber action, i.e., fluid movement through a restricted orifice.

Assume now that the sprayer boom 32 engages an obstruction which causes the sprayer boom to pivot rearwardly. Actuatlly, pure rearward movement of the sprayer boom 32 is not possible due to the fact that the cable 46 causes the sprayer boom 32 to pivot upwardly in response to rearward pivotal movement thereof. However, assuming for the sake of explanation that such pure rearward pivotal movement of the sprayer boom were possible, the portions of the cable 74 of the Bowden wire 72 which are not contained within the casing 76 would collapse, thereby permitting free rearwardly pivotal movement of the sprayer boom 32. Simultaneously, the springs 84 would move the plate 82 upwardly in the housing 80. Due to the check valve of the fluid cylinder apparatus 86, such upward movement of the plate 82 would be substantially unrestrained.

After all of the slack in the Bowden wire 72 had been taken up by the springs 84, upward movement of the plate 82 and the housing 80 would cease. Thereafter, the plate 82 would move downwardly in the housing 80 in response to the return movement of the sprayer boom operating through the bracket 70 and the Bowden wire 72. This downward movement of the plate 82 and therefore the return movement of the sprayer boom 32 would be substantially damped under the action of the fluid cylinder apparatus 86. The sprayer boom 32 would therefore return to the normal position relatively slowly, and with little or no shock load and little or no vibration.

Actuatlly, the sprayer boom 32 cannot pivot solely rearwardly due to the action of the cable 76, and seldom if ever pivots solely upwardly. Instead, a combination of these two pivotal movements is experienced upon the engagement of the sprayer boom 32 with an obstruction. It will thus be appreciated that both the fluid cylinder apparatus 68 and the fluid cylinder apparatus 86 both serve in combination to damp the return movement of the sprayer boom 32. In this regard the fluid cylinder apparatus 68 serves primarily to damp the vertical component of the return movement and the fluid cylinder apparatus 86 serves primarily to damp the horizontal component of the return movement of the sprayer boom 32, it being understood that the fluid cylinder appraratus 68 and the fluid cylinder apparatus 86 both serve at least to some extent to damp motion in both the vertical plane and the horizontal plane.

Like the arrangement of the fluid cylinder apparatus 68, the arrangement of the fluid cylinder apparatus 86 functions to exert graduated damping on the return motion of the boom 32. This is due to the arcuate movement of the bracket 70 and the point of connection of the Bowden wire 72 thereto as the boom 32 pivots rearwardly. The graduated damping of the return motion of the boom 32 has been found to be highly advantageous in permitting rapid return movement of the boom from a pivoted position to the normal position while simultaneously eliminating potential damage to the boom due to shock or vibration loads.

The graduated damping that is applied to the boom 32 by the arrangement of the fluid cylinder apparatus 68 and by the arrangement of the fluid cylinder apparatus 86 is further advantageous in that it permits the boom 32 to comprise a light, floatingly supported structure and in that it prevents the application of significant shock and vibration loads to the boom. These two factors have been found to combine to substantially extend the working life of the boom structure regardless of whether or not the boom should engage fixed objects, etc. This in turn allows the operation of the mobile fluid sprayer system 10 over rough terrain at considerably higher speeds than would otherwise be possible. A further advantage involves the fact that improved spray patterns are achieved due to stability of the boom structure.

The fact that the cable 46 causes the sprayer boom 32 to pivot upwardly in response to rearward pivotal movement thereof is advantageous for a number of reasons. First, upwardly pivotal movement of the sprayer boom in combination with rearward pivotal movement thereof has been found to be helpful in effecting clearance of the boom from any obstruction that it may have engaged. Second, the fact that the cable 46 causes the sprayer boom 32 to pivot upwardly in response to rearward pivotal movement thereof causes the sprayer boom 32 to return to the normal position illustrated in FIGS. 2 and 3 under the action of gravity following both upward pivotal movement and rearward pivotal movement. This is advantageous in eliminating the necessity of providing springs or other apparatus for returning the sprayer boom to the normal position.

Figure 4:
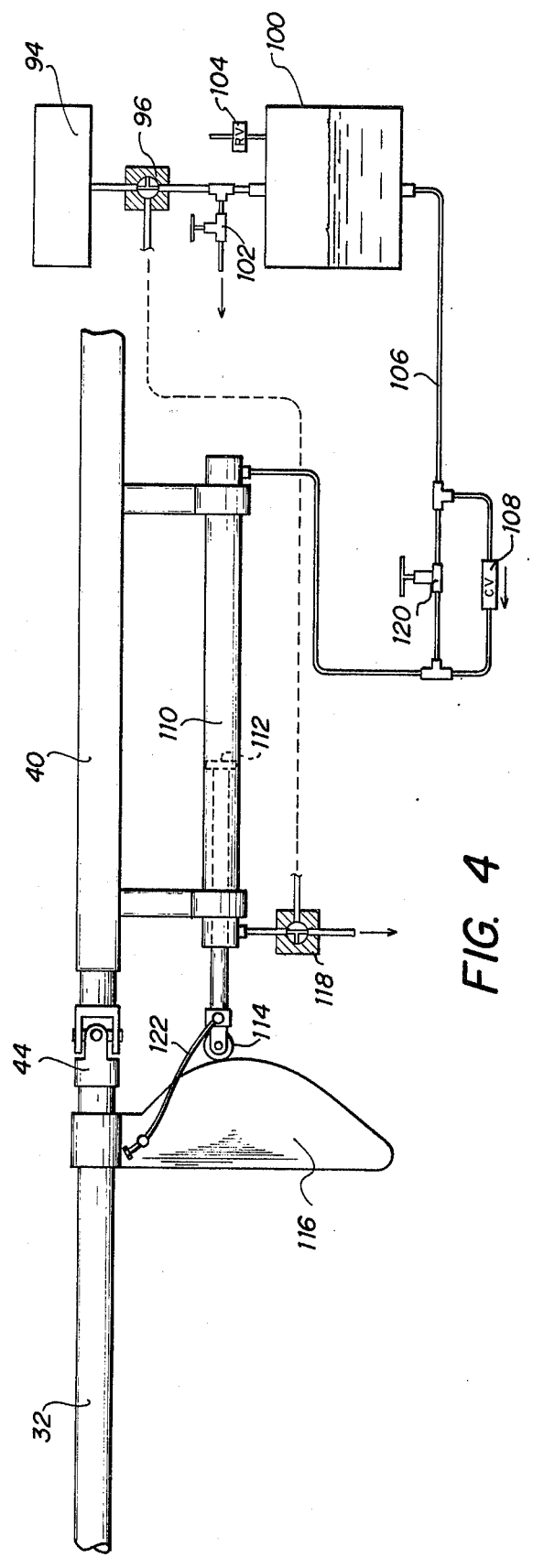
FIG. 4 is an illustration of a second embodiment of the horizontal damping apparatus of the mobile fluid sprayer system.

Referring now to FIG. 4, there is shown a second embodiment of the portion of the mobile fluid sprayer system 10 of FIGS. 1, 2 and 3 which serves primarily to substantially damp the horizontal return motion of the sprayer booms 28 and 30. Compressed air is received from a source 94 which may comprise an air compressor driven by the engine of the vehicle 12. Compressed air from the source is directed through a three-way valve 96 to an accumulator 100 having a quantity of hydraulic fluid contained in the lower portion thereof. An exhaust valve 102 is normally closed. The pressure within the accumulator 100 is maintained at a predetermined level by a relief valve 104.

The hydraulic fluid in the lower portion of the accumulator 100 is maintained at a predetermined pressure by the compressed air in the upper portion thereof. Hydraulic fluid is directed from the accumulator 100 through a line 106 and a check valve 108 to the blind end of a cylinder 110 having a piston 112 reciprocable therein. The piston 112 extends to a cam follower 114 which engages a cam 116 secured to the sprayer boom 32.

The rod end of the cylinder 110 is normally exhausted through a three-way valve 118. Therefore, upon engagement of the sprayer boom 32 with an obstruction causing rearward horizontal pivoting of the boom, the boom is free to pivot rearwardly. Such pivotal movement may cause the cam 116 to become disengaged from the cam follower 114. In any event, the piston 112 immediately begins to extend under the action of pressurized hydraulic fluid received from the accumulator 100. The cam follower 114 therefore reengages the cam 116 and remains engaged therewith until the sprayer boom 32 begins its return pivotal movement.

As the sprayer boom 32 pivots back to its normal position, hydraulic fluid is returned from the blind end of the cylinder 110 to the accumulator 100. The return flow of the hydraulic fluid causes the check valve 108 to close, whereby the hydraulic fluid must return through a throttle valve 120. The return movement of the sprayer boom 32 is therefore substantially damped due to the flow of the hydraulic fluid through the restricted opening afforded by the throttle valve 120. Like the damping afforded by the embodiment of FIGS. 1, 2 and 3, the damping afforded by the embodiment of FIG. 4 is graduated according to the profile of the cam 116, with the damping rate being greatest when the boom is at or near the normal position, and being reduced as the boom is pivoted away from the normal position.

One advantage to the use of the embodiment of FIG. 4 involves the fact that the profile of the cam 116 may be adjusted to suit particular requirements. In this manner, the graduated damping that is afforded by the embodiment of FIG. 4 is easily regulated. Also, the cam functions to damp any overtravel of the boom. Finally, the pressure within the accumulator may be adapted for adjustement by the operator of the vehicle in accordance with particular terrain conditions, etc.

It will be noted that the cam follower 114 is connected to the cam 116 by means of a cable 122. The cable 122 has sufficient slack so as to not interfere with the operation of the apparatus in accommodating rearward pivotal movement of the sprayer boom 32. In the event that it is desired to fold the sprayer boom 32 for storage or transporation purposes, the exhaust valve 102 is opened to relieve the pressure in the accumulator 100, and the three-way valves 96 and 118 are manipulated to direct the output of the source of compressed air 94 to the rod end of the cylinder 110. By this means the piston 112 operates through the cable 122 to fold the sprayer boom 32.

From the foregoing it will be appreciated that the use of the present invention results in numerous advantages over the prior art. First, in accordance with the invention, the sprayer booms of a mobile fluid sprayer apparatus are permitted to pivot both upwardly and rearwardly in order to clear obstructions which may be encountered during spraying operations. Second, the return movement of the sprayer booms to their normal orientations is substantially damped, whereby the sprayer booms are returned under conditions of little or no shock load and little or no vibration. These two factors have been found to combine in such a way as to permit mobile fluid sprayer systems incorporating the present invention to operate many times longer than prior art mobile spraying systems, and without necessitating repair or replacement of the component parts of the system. A further advantage to the use of the invention involves the fact that in accordance therewith the return motion of the boom is subjected to gradual damping. This permits the boom to be returned rapidly from a pivoted position, but without encountering significant shock or vibration loads. The graduated damping of the boom motion also permits operation of mobile fluid sprayer systems incorporating the invention over rough terrain at relatively high speeds without damage to the boom while simultaneously providing improved spray patterns. Another advantage to the use of the invention involves the fact that mobile fluid sprayer systems may be constructed in accordance therewith utilizing a small number of readily available and easily fabricated parts. This is advantageous in making systems incorporating the invention economical to construct, purchase and use. Other advantages deriving from the use of the invention will readily suggest themselves to those skilled in the art.

Although preferred embodiments of the invention have been illustrated in the accompanying Drawings and described in the foregoing Detailed Description, it will be understood that the invention is not limited to the embodiments disclosed, but is capable of numerous rearrangements, modifications and substitutions of parts and elements without departing from the spirit of the invention.

What is claimed is:
1. A mobile fluid sprayer system comprising:
   a vehicle adapted for movement over a surface;
   fluid reservoir means mounted on the vehicle;
   means mounted on the vehicle for withdrawing fluid from the fluid reservoir means and for applying pressurized fluid;
   at least one sprayer boom means mounted on the vehicle and including a fluid passageway extending from the means for supplying pressurized fluid to at least one fluid discharge nozzle;
   means for normally positioning the sprayer boom means in a laterally extending orientation relative to the vehicle and permitting the sprayer boom means to pivot freely upwardly and rearwardly in response to engagement of the sprayer boom means with an obstruction;
   means for damping the return movement of the sprayer boom means from a pivoted position relative to the vehicle to the normal position relative thereto; and
   the damping means further comprising means to damp the return movement of the sprayer boom means at a graduated rate with the damping rate being greatest when the sprayer boom means is at or near the normal position and with the damping rate being reduced as the sprayer boom means is pivoted away from the normal position.
2. A mobile fluid sprayer system comprising:
   a vehicle adapated for movement over a surface;
   fluid reservoir means mounted on the vehicle;

means mounted on the vehicle for withdrawing fluid from the fluid reservoir means and for applying pressurized fluid;

at least one sprayer boom means mounted on the vehicle and including a fluid passageway extending from the means for supplying presurized fluid to at least one fluid discharge nozzle;

means for normally positioning the sprayer boom means in a laterally extending orientation relative to the vehicle and permitting the sprayer boom means to pivot freely upwardly and rearwardly in response to engagement of the sprayer boom means with an obstruction;

means for damping the return movement of the sprayer boom means from a pivoted position relative to the vehicle to the normal position relative thereto; and the inboard end of the sprayer boom means being pivotally connected to the vehicle by joint means which accomodate pivotal movement of the sprayer boom means about perpendicular axes which are in turn mutually perpendicular to the sprayer boom means.

3. A mobile fluid sprayer system comprising:
a vehicle adapted for movement over a surface;
fluid reservoir means mounted on the vehicle;
means mounted on the vehicle for withdrawing fluid from the fluid reservoir means and for applying pressurized fluid;
at least one sprayer boom means on the vehicle and including a fluid passageway extending from the means for supplying pressurized fluid to at least one fluid discharge nozzle;
means for normally positioning the sprayer boom means in a laterally extending orientation relative to the vehicle and permitting the sparyer boom means to pivot freely upwardly and rearwardly in response to engagement of the sprayer boom means with an obstruction;
means for damping the return movement of the sprayer boom means from a pivoted position relative to the vehicle to the normal position relative thereto;
the means for normally positioning the sprayer boom means in a predetermined lateral orientation relative to the vehicle comprising a pair of cables each connected to the sprayer boom means at a predetermined point, one of the cables extending angularly upwardly and forwardly from the sprayer boom means and the other cable extending angularly upwardly and rearwardly from the sprayer boom means, and means connecting the cables to the vehicle at points located fowardly and rearwardly from the point of connection of the sprayer boom means thereto.

4. A mobile fluid sprayer system comprising:
a vehicle adapted for movement over a surface;
fluid reservoir means mounted on the vehicle;
means mounted on the vehicle for withdrawing fluid from the fluid reservoir means and for applying pressurized fluid;
at least one sprayer boom means mounted on the vehicle and including a fluid passageway extending from the means for supplying pressurized fluid to at least one fluid discharge nozzle;
means for normally positioning the sprayer boom means in a laterally extending orientation relative to the vehicle and permitting the sprayer boom means to pivot freely upwardly and rearwardly in response to engagement of the sprayer boom means with an obstruction;

means for damping the return movement of the sprayer boom means from a pivoted position relative to the vehilce to the normal position relative thereto; and the damping means is further characterized by first and second fluid cylinder means, one of the cylinder means primarily for damping vertical return movement of the sprayer boom means and the other fluid cylinder means primarily for damping horizontal return movement of the sprayer boom means.

5. A vehicular sprayer boom mounting comprising:
an elongate sprayer boom;
means for supporting the sprayer boom on a vehicle and for normally positioning the sprayer boom in a laterally extending orientation relative to the vehicle;
means for permitting the sprayer boom to pivot freely rearwardly in response to engagement of the sprayer boom with an obstruction;
means for substantially damping return movement of the sprayer boom from a rearwardly pivoted position to the normal position;
means permitting the sprayer boom to pivot freely upwardly in response to engagement of the sprayer boom with an obstruction; and
means for substantially damping return movement of the sprayer boom from an upwardly pivoted position to the normal position.

6. The mobile fluid sprayer system according to claim 5 wherein the damping means functions to damp the return movement of the sprayer boom means at a graduated rate with the damping rate being greatest when the sprayer boom means is at or near the normal position and with the damping rate being reduced as the sprayer boom means is pivoted away from the normal position.

7. The vehicular sprayer boom mounting according to claim 5 wherein the means for supporting the sprayer boom on a vehicle includes joint means connecting the sprayer boom to the vehicle and permitting pivotal movement of the sprayer boom relative to the vehicle about axes which are perpendicular to each other and which are in turn mutually perpendicular to an axis extending longitudinally along the sprayer boom.

8. The vehicular sprayer boom mounting according to claim 7 wherein the means for normally positioning the sprayer boom in a laterally extending orientation relative to the vehicle includes:
bracket means supported on the vehicle for pivotal movement about a horizontal axis; and
a pair of cables each connected between the bracket means and the boom;
one of the cables extending from a predetermined point on the boom to a point on the bracket means located forwardly of the boom and the other cable extending from a predetermined point on the boom to a point on the bracket means located rearwardly of the boom.

9. The vehicular sprayer boom mounting according to claim 8 wherein the means for damping return movement of the sprayer boom from an upwardly pivoted position to the normal position includes:

means permitting the bracket means to pivot upwardly; and fluid cylinder means for upward and downward pivotal movement of the bracket means.

10. The vehicular sprayer boom mounting according to claim 5 wherein the means for damping return movement of the boom from a rearwardly pivoted position to the normal position includes:
fluid cylinder means;
means causing the fluid cylinder means to follow the sprayer boom during rearward pivotal movement thereof; and
means operatively interconnecting the fluid cylinder means and the boom during return movement of the boom so that the fluid cylinder means damps the return movement of the boom to the normal position.

11. A vehicular sprayer boom mounting comprising:
elongate sprayer boom means;
means connecting the sprayer boom means to a vehicle;
means for normally positioning the sprayer boom means in a laterally extending orientation relative to the vehicle;
means permitting the sprayer boom means to pivot freely rearwardly relative to the vehicle in response to engagement of the sprayer boom means with an obstruction;
means for damping the return of the sprayer boom means from a rearwardly pivoted position to the normal position; and
the damping means further comprising means to damp the return movement of the sprayer boom means at a graduated rate with the damping rate being greatest when the sprayer boom means is at or near the normal position and with the damping rate being reduced as the sprayer boom means is pivoted away from the normal position.

12. A vehicular sprayer boom mounting comprising:
elongate sprayer boom means;
means connecting the sprayer boom means to a vehicle;
means for normally positioning the sprayer boom means in a laterally extending orientation relative to the vehicle;
means permitting the sprayer boom means to pivot freely rearwardly relative to the vehicle in response to engagement of the sprayer boom means with an obstruction;
means for damping the return of the sprayer boom means from a rearwardly pivoted position to the normal position;
the means for damping the return movement of the sprayer boom comprising fluid cylinder means;
means permitting the fluid cylinder means to follow the sprayer boom means during rearward pivotal movement thereof; and
means operatively connecting the fluid cylinder means to the sprayer boom means during return movement of the sprayer boom means so that the fluid cylinder means functions to damp the return movement of the sprayer boom means to the normal position.

13. A vehicular sprayer boom mounting comprising:
elongate sprayer boom means;
means connecting the sprayer boom means to a vehicle;
means fo normally positioning the sprayer boom means in a laterally extending orientation relative to the vehicle;
means permitting the sprayer boom means to pivot freely rearwardly relative to the vehicle in response to engagement of the sprayer boom means with an obstruction;
mean for damping the return of the sprayer boom means from a rearwardly pivoted position to the normal position; and
the means connecting the sprayer boom means to the vehicle comprising universal joint means connecting the sprayer boom means to the vehicle and accommodating pivotal movement of the sprayer boom means relative to the vehicle about perpendicular axes which are in turn mutually perpendicular to the sprayer boom means.

14. The vehicular sprayer boom mounting according to claim 13 wherein the means for normally positioning the sprayer boom means in a laterally extending orientation relative to the vehicle comprises:
bracket means mounted on the vehicle and extending both forwardly and rearwardly from the universal joint means;
a pair of cables each connected to the sprayer boom means at a predetermined point lengthwise thereof; and
means connecting the cables to the bracket means at points located forwardly and rearwardly from the universal joint means.

15. The vehicular sprayer boom mounting according to claim 14 further characterized by:
means mounting the bracket means on the vehicle for pivotal movement about a horizontal axis;
means for pivoting the bracket means upwardly whenever the sprayer boom means pivots upwardly; and
means for damping upward and downward pivotal movement of the bracket means.

16. The vehicular sprayer boom mounting according to claim 15 wherein the means for pivoting the bracket means upwardly whenever the sprayer boom means is pivoted upwardly comprises a spring mounted between the vehicle and the bracket means, and wherein the means for damping upward and downward pivotal movement of the bracket means comprises fluid cylinder means connected between the bracket means and the vehicle.

17. A vehicular sprayer boom mounting comprising:
a elongate sprayer boom means;
means connecting the sprayer boom means to a vehicle;
means for normally positioning the sprayer boom means in a laterally extending orientation relative to the vehicle;
means permitting the sprayer boom means to pivot freely upwardly relative to the vehicle in response to engagement of the sprayer boom means with an obstruction;
means for damping the return of the sprayer boom means from an upwardly pivoted position to the normal position;
the means for normally positioning the sprayer boom means in a laterally extending orientation relative to the vehicle comprising:
bracket means mounted on the vehicle and extending both forwardly and rearwardly from the joint means;

a pair of cables each connected to the sprayer boom means at a predetermined point lengthwise thereof; and means connecting the cables to the bracket means at points located forwardly and rearwardly from the joint means.

18. The vehicular sprayer boom mounting according to claim 17 further characterized by:

means mounting the bracket means on the vehicle for pivotal movement about a horizontal axis; and means for pivoting the bracket means upwardly whenever the sprayer boom means pivots upwardly;

wherein the means for damping return movement of the sprayer boom functions by damping upward and downward pivotal movement of the bracket means.

19. The vehicular sprayer boom mounting according to claim 18 wherein the means for pivoting the bracket means upwardly whenever the sprayer boom means is pivoted upwardly comprises a spring mounted between the vehicle and the bracket means, and wherein the means for damping upward and downward pivotal movement of the bracket means comprises fluid cylinder means connected between the bracket means and the vehicle.

* * * * *